(12) United States Patent
Murphy et al.

(10) Patent No.: US 9,143,739 B2
(45) Date of Patent: Sep. 22, 2015

(54) VIDEO ANALYTICS WITH BURST-LIKE TRANSMISSION OF VIDEO DATA

(75) Inventors: William A. Murphy, Glace Bay (CA); Jason Phillips, Ottawa (CA)

(73) Assignee: IWATCHLIFE, INC., Ottawa, Ontario (CA)

( * ) Notice: Subject to any disclaimer, the term of this patent is extended or adjusted under 35 U.S.C. 154(b) by 905 days.

(21) Appl. No.: 13/102,540

(22) Filed: May 6, 2011

(65) Prior Publication Data

US 2011/0273563 A1 Nov. 10, 2011

Related U.S. Application Data

(60) Provisional application No. 61/332,302, filed on May 7, 2010.

(51) Int. Cl.
| | |
|---|---|
| *H04N 7/18* | (2006.01) |
| *H04N 9/804* | (2006.01) |
| *H04N 21/234* | (2011.01) |
| *H04L 12/64* | (2006.01) |

(52) U.S. Cl.
CPC ............. *H04N 7/18* (2013.01); *H04N 7/181* (2013.01); *H04N 9/8042* (2013.01); *H04N 21/23418* (2013.01); *H04L 12/6418* (2013.01)

(58) Field of Classification Search
CPC ....... H04N 7/18; H04N 7/181; H04N 9/8042; H04N 21/23418; H04L 12/6418
USPC .......................................................... 348/143
See application file for complete search history.

(56) References Cited

U.S. PATENT DOCUMENTS

| | | | |
|---|---|---|---|
| 6,166,729 A | 12/2000 | Acosta et al. | |
| 6,195,117 B1 | 2/2001 | Miyazaki | |

(Continued)

FOREIGN PATENT DOCUMENTS

| | | | |
|---|---|---|---|
| JP | 2004120178 A | 4/2004 | |
| JP | 2004180290 A | 6/2004 | |

(Continued)

OTHER PUBLICATIONS

Saptharish, M. et al., "An Information Value Driven Architecture for Urban Video Surveillance in Data and Attention Bandwidth Constrained Environments," Proceedings of the Sixth IEEE International Conference on Advanced Video and Signal Based Surveillance, pp. 122-127, Sep. 2-4, 2009.

*Primary Examiner* — Behrooz Senfi
*Assistant Examiner* — Maria Vazquez Colon
(74) *Attorney, Agent, or Firm* — The Noblitt Group, PLLC

(57) ABSTRACT

A method for providing video data for video analytics processing includes capturing a plurality of individual frames of video data, using a video source that is disposed at an acquisition end. A plurality of data-frame-groups is formed, each data-frame-group being associated with a different time period of a plurality of consecutive and non-overlapping time periods. A data-frame-group that is associated with a specific time period comprises individual frames of video data that are captured during that specific time period. Additionally, each data-frame-group comprises relatively fewer individual frames of video data than are captured during the specific time period associated therewith. The plurality of data-frame-groups is transmitted from the acquisition end to a remotely located server via an IP network. In particular, the transmission of successive data-frame-groups is separated one from the other by an interval of time.

19 Claims, 12 Drawing Sheets

(56) References Cited

U.S. PATENT DOCUMENTS

| | | | |
|---|---|---|---|
| 6,411,209 B1 * | 6/2002 | Lyons et al. | 340/541 |
| 6,462,785 B1 | 10/2002 | Carraro et al. | |
| 6,831,675 B2 | 12/2004 | Shachar et al. | |
| 6,879,998 B1 | 4/2005 | Raciborski et al. | |
| 7,111,045 B2 | 9/2006 | Kato et al. | |
| 7,382,244 B1 | 6/2008 | Donovan | |
| 7,397,821 B2 * | 7/2008 | Meidan et al. | 370/474 |
| 7,839,926 B1 * | 11/2010 | Metzger et al. | 375/240.01 |
| 7,881,505 B2 | 2/2011 | Schneiderman et al. | |
| 8,041,338 B2 | 10/2011 | Chen et al. | |
| 8,139,817 B2 | 3/2012 | Laganiere et al. | |
| 8,185,959 B2 | 5/2012 | Bellwood et al. | |
| 8,290,999 B2 | 10/2012 | Shepherd et al. | |
| 8,326,327 B2 | 12/2012 | Hymel et al. | |
| 8,335,763 B2 | 12/2012 | Narayanan et al. | |
| 8,396,246 B2 | 3/2013 | Anbalagan et al. | |
| 8,433,136 B2 | 4/2013 | Epshtein et al. | |
| 8,448,072 B1 | 5/2013 | Lai | |
| 8,473,420 B2 | 6/2013 | Bohus | |
| 8,675,066 B2 * | 3/2014 | Trundle et al. | 348/143 |
| 2003/0025599 A1 * | 2/2003 | Monroe | 340/531 |
| 2003/0070177 A1 | 4/2003 | Kondo et al. | |
| 2003/0107648 A1 | 6/2003 | Stewart et al. | |
| 2003/0167176 A1 | 9/2003 | Knudson et al. | |
| 2003/0204856 A1 | 10/2003 | Buxton | |
| 2004/0240546 A1 | 12/2004 | Wells | |
| 2005/0169546 A1 | 8/2005 | Shin | |
| 2005/0195823 A1 | 9/2005 | Chen et al. | |
| 2005/0271250 A1 | 12/2005 | Vallone et al. | |
| 2006/0053459 A1 | 3/2006 | Simerly et al. | |
| 2006/0192698 A1 | 8/2006 | Morel | |
| 2006/0195569 A1 | 8/2006 | Barker | |
| 2006/0239645 A1 | 10/2006 | Curtner | |
| 2006/0271658 A1 | 11/2006 | Beliles | |
| 2007/0013776 A1 | 1/2007 | Venetianer | |
| 2007/0035632 A1 | 2/2007 | Silvernail et al. | |
| 2007/0082700 A1 | 4/2007 | Landschaft et al. | |
| 2007/0172155 A1 | 7/2007 | Guckenberger | |
| 2007/0217765 A1 | 9/2007 | Itoh et al. | |
| 2008/0108339 A1 | 5/2008 | Shaffer et al. | |
| 2008/0129844 A1 | 6/2008 | Cusack et al. | |
| 2008/0136908 A1 | 6/2008 | Carter | |
| 2008/0166966 A1 | 7/2008 | Hamasaki et al. | |
| 2008/0184245 A1 | 7/2008 | St-Jean | |
| 2008/0235592 A1 | 9/2008 | Trauth | |
| 2008/0243614 A1 * | 10/2008 | Tu et al. | 705/14 |
| 2008/0258880 A1 | 10/2008 | Smith et al. | |
| 2008/0270490 A1 | 10/2008 | Watterott et al. | |
| 2008/0279481 A1 | 11/2008 | Ando | |
| 2008/0304565 A1 | 12/2008 | Sakhardande et al. | |
| 2009/0015671 A1 | 1/2009 | Addy | |
| 2009/0021583 A1 | 1/2009 | Salgar et al. | |
| 2009/0031381 A1 | 1/2009 | Cohen et al. | |
| 2009/0122150 A1 | 5/2009 | Shabtay et al. | |
| 2009/0141939 A1 | 6/2009 | Chambers | |
| 2009/0141993 A1 | 6/2009 | Ma et al. | |
| 2009/0174763 A1 | 7/2009 | Bengtsson | |
| 2009/0189981 A1 | 7/2009 | Siann et al. | |
| 2009/0213245 A1 | 8/2009 | Harper et al. | |
| 2009/0217343 A1 | 8/2009 | Bellwood | |
| 2009/0219387 A1 | 9/2009 | Marman | |
| 2009/0219411 A1 * | 9/2009 | Marman et al. | 348/231.99 |
| 2009/0225164 A1 | 9/2009 | Renkis | |
| 2009/0238542 A1 | 9/2009 | Adiletta et al. | |
| 2009/0245573 A1 | 10/2009 | Saptharishi et al. | |
| 2009/0324137 A1 | 12/2009 | Stallings et al. | |
| 2010/0097471 A1 * | 4/2010 | Drive et al. | 348/159 |
| 2010/0158315 A1 | 6/2010 | Martin | |
| 2010/0177938 A1 | 7/2010 | Martinez et al. | |
| 2010/0191827 A1 | 7/2010 | Martin | |
| 2010/0231714 A1 | 9/2010 | Flores et al. | |
| 2011/0022529 A1 | 1/2011 | Barsoba et al. | |
| 2011/0092248 A1 | 4/2011 | Evanitsky | |
| 2011/0109742 A1 | 5/2011 | Laganiere et al. | |
| 2011/0112899 A1 | 5/2011 | Strutton et al. | |
| 2011/0113461 A1 | 5/2011 | Laganiere et al. | |
| 2011/0143728 A1 | 6/2011 | Holopainen | |
| 2011/0211584 A1 | 9/2011 | Mahmoud | |
| 2011/0211764 A1 | 9/2011 | Krupka | |
| 2011/0267462 A1 | 11/2011 | Cheng | |
| 2011/0314159 A1 | 12/2011 | Murphy | |
| 2012/0015668 A1 | 1/2012 | Mgrdechian et al. | |
| 2012/0033026 A1 | 2/2012 | Murphy | |
| 2012/0033027 A1 | 2/2012 | Murphy | |
| 2012/0033028 A1 | 2/2012 | Murphy | |
| 2012/0033031 A1 | 2/2012 | Murphy | |
| 2012/0036262 A1 | 2/2012 | Murphy | |
| 2012/0098918 A1 | 4/2012 | Murphy | |
| 2012/0129553 A1 | 5/2012 | Phillips et al. | |
| 2012/0194676 A1 | 8/2012 | Laganiere et al. | |
| 2012/0195363 A1 | 8/2012 | Laganiere et al. | |
| 2012/0207349 A1 | 8/2012 | Murphy | |
| 2012/0207356 A1 | 8/2012 | Murphy | |
| 2014/0036073 A1 | 2/2014 | Black | |
| 2014/0036090 A1 | 2/2014 | Black | |

FOREIGN PATENT DOCUMENTS

| | | |
|---|---|---|
| JP | 2006279464 A | 10/2006 |
| WO | WO 2005/004062 A2 | 1/2005 |
| WO | WO 2006/012384 A2 | 2/2006 |
| WO | WO 2008/092255 A1 | 8/2008 |
| WO | WO 2008/154003 A2 | 12/2008 |
| WO | WO 2009/111377 A1 | 9/2009 |

* cited by examiner

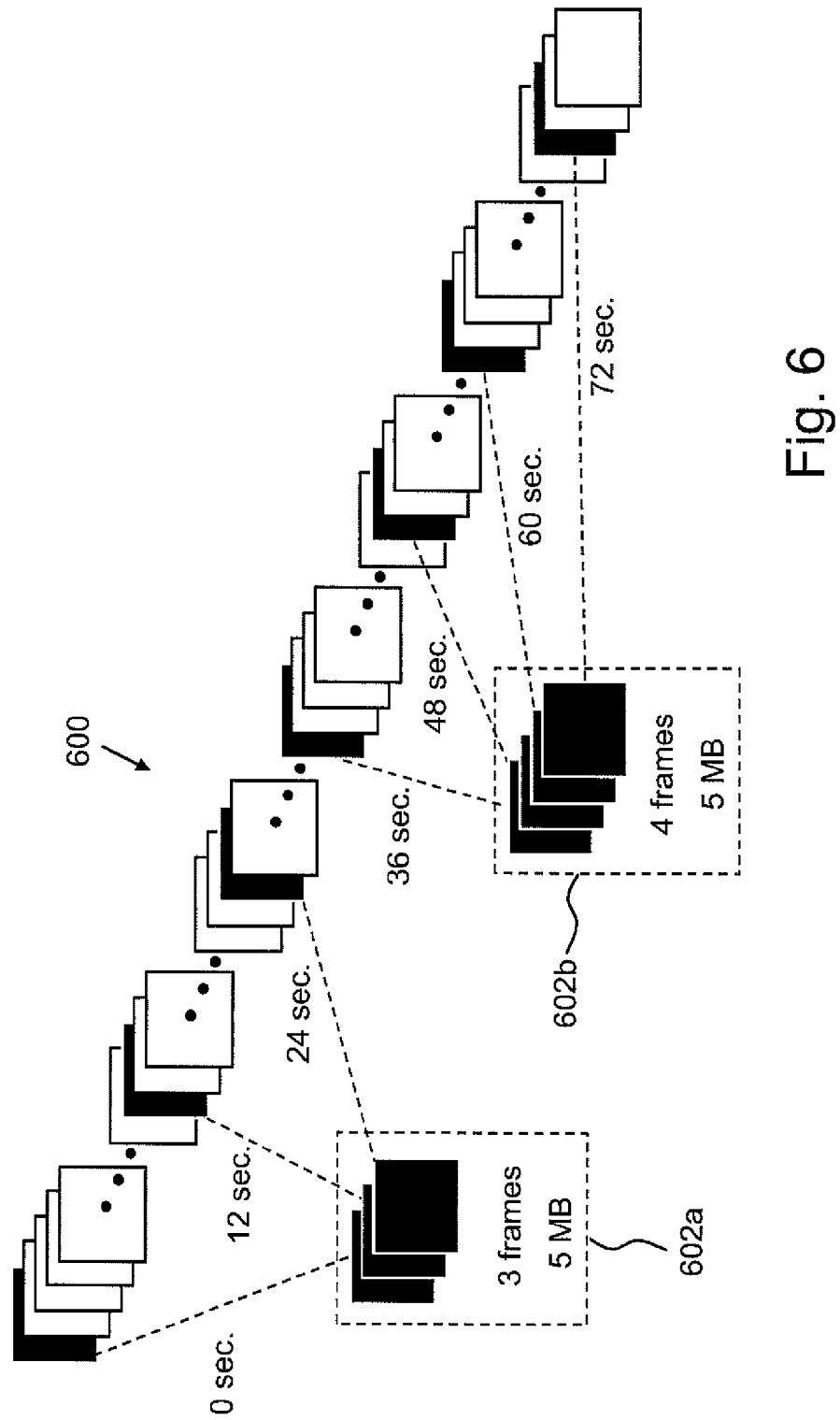

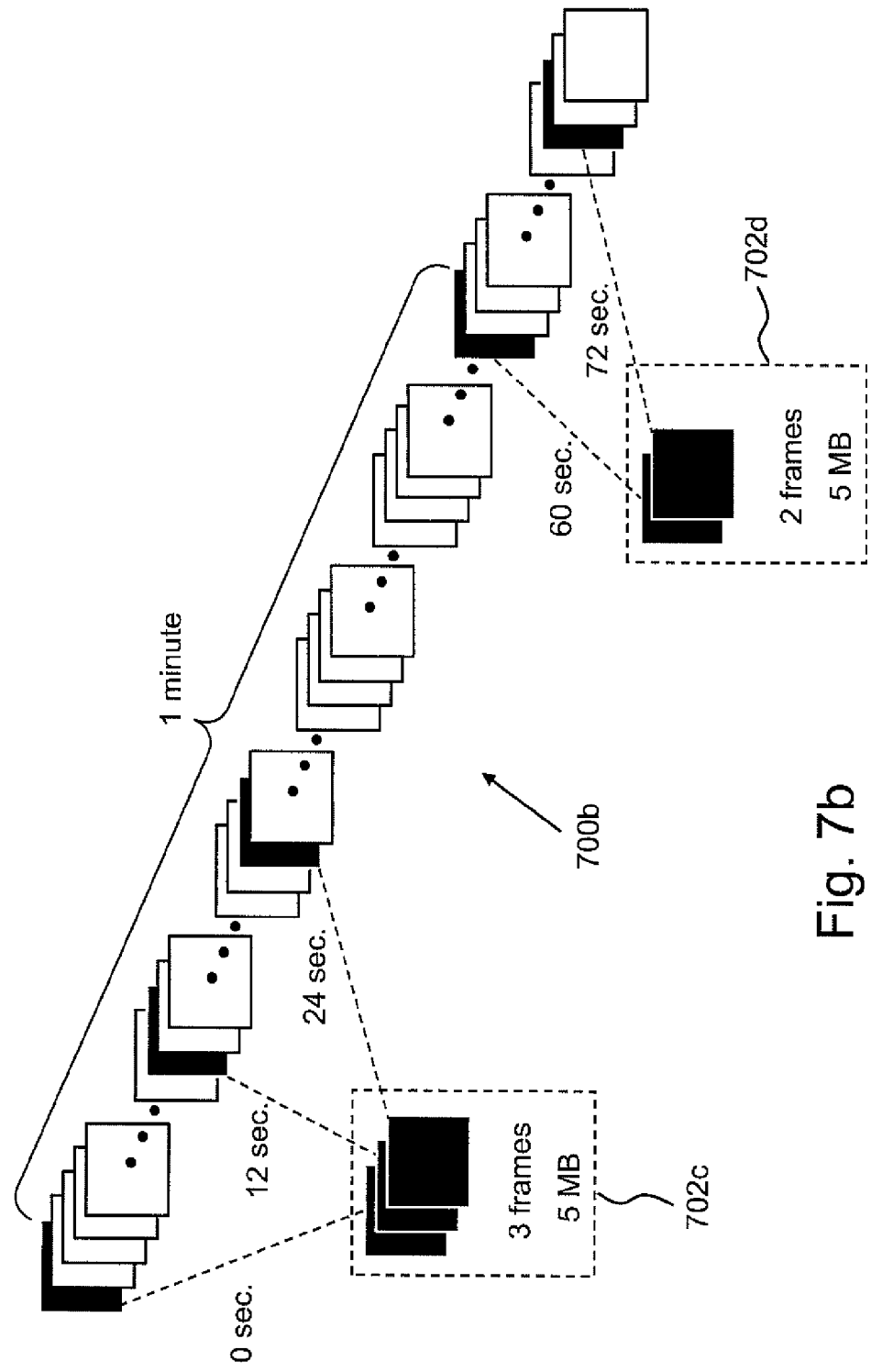

US 9,143,739 B2

VIDEO ANALYTICS WITH BURST-LIKE TRANSMISSION OF VIDEO DATA

FIELD OF THE INVENTION

The instant invention relates generally to video analytics, and more particularly to video analytics performed on data-frame-groups of video data that are transmitted via an Internet Protocol (IP) network between a video acquisition end and a centralized video analytics location.

BACKGROUND OF THE INVENTION

Modern security and surveillance systems have come to rely very heavily on the use of video surveillance cameras for the monitoring of remote locations, entry/exit points of buildings and other restricted areas, high-value assets, etc. The majority of surveillance video cameras that are in use today are analog. Analog video surveillance systems run coaxial cable from closed circuit television (CCTV) cameras to centrally located videotape recorders or hard drives. Increasingly, the resultant video footage is compressed on a digital video recorder (DVR) to save storage space. The use of digital video systems (DVS) is also increasing; in DVS, the analog video is digitized, compressed and packetized in IP, and then streamed to a server.

More recently, IP-networked digital video systems have been implemented. In this type of system the surveillance video is encoded directly on a digital camera, in H.264 or another suitable standard for video compression, and is sent over Ethernet at a lower bit rate. This transition from analog to digital video is bringing about long-awaited benefits to security and surveillance systems, largely because digital compression allows more video data to be transmitted and stored. Of course, a predictable result of capturing larger amounts of video data is that more personnel are required to review the video that is provided from the video surveillance cameras. Advantageously, storing the video can reduce the amount of video data that is to be reviewed, since the motion vectors and detectors that are used in compression can be used to eliminate those frames with no significant activity. However, since motion vectors and detectors offer no information as to what is occurring, someone still must physically screen the captured video to determine suspicious activity.

Another disadvantage of network-based video surveillance and centralized video monitoring solutions is that the network may become overloaded due to the large amount of video data that is involved. This problem is particularly severe when the traffic has to pass over a wide area network, where a service provider typically is charging for the transit of data. In such systems, video data are transmitted constantly to a central location or server for processing and storage. Of course, a significant amount of video that is recorded today does not contain any relevant or actionable data. For instance, a surveillance camera may record video for hours before a person of interest walks into the field of view, or before a suspicious car drives into a monitored parking lot late at night, etc. As a result, there has been a push to develop methods that significantly increase the effectiveness of monitoring security and surveillance video.

The market is currently seeing a migration toward IP-based hardware edge devices with built-in video analytics, such as IP cameras and encoders, including passive infrared (PIR) based motion detection, analytics on a box, etc. Video analytics electronically recognizes the significant features within a series of frames and allows the system to issue alerts when specific types of events occur, thereby speeding real-time security response. Automatically searching the captured video for specific content also relieves personnel from tedious hours of reviewing the video, and decreases the number of personnel that is required to screen the video. Furthermore, when 'smart' cameras and encoders process images at the edge, they record or transmit only important events, for example only when someone enters a predefined area that is under surveillance, such as a perimeter along a fence. Accordingly, deploying an edge device is one approach that can be used to reduce the strain on the network in terms of system requirements and bandwidth.

Unfortunately, deploying 'smart' cameras and encoders or analytics on DVR at the edge carries a significantly higher cost premium compared to deploying a similar number of basic digital or analog cameras. Furthermore, since the analytics within the cameras is designed into the cameras, there is a tradeoff between flexibility and cost, with higher cost solutions providing more flexibility. In essence, to support changing functionality requires a new camera or a significantly higher cost initial camera or local DVR.

It would be advantageous to provide a method and system that overcomes at least some of the above-mentioned limitations.

SUMMARY OF EMBODIMENTS OF THE INVENTION

In accordance with an aspect of the invention there is provided a method comprising: capturing video data using a video source disposed at an acquisition end, the video data comprising a plurality of individual frames of video data that are captured during a first period of time, the individual frames of video data being captured consecutively at a known frame rate; forming a first data-frame-group comprising at least two individual frames of video data selected from the plurality of individual frames of video data, the first data-frame-group comprising relatively fewer individual frames of video data than the plurality of individual frames of video data; transmitting the first data-frame-group from the acquisition end to a remotely located server via an IP network; forming a second data-frame-group comprising at least two other individual frames of video data selected from the plurality of individual frames of video data, the second data-frame-group and the first data-frame-group in combination comprising fewer individual frames of video data than the plurality of individual frames of video data; and, transmitting the second data-frame-group from the acquisition end to a remotely located server via an IP network.

In accordance with an aspect of the invention there is provided a method comprising: capturing a plurality of individual frames of video data using a video source disposed at an acquisition end; forming a plurality of data-frame-groups, each data-frame-group being associated with a different time period of a plurality of consecutive and non-overlapping time periods, such that a data-frame-group that is associated with a specific time period comprises individual frames of video data that are captured during that specific time period, and such that each data-frame-group comprises relatively fewer individual frames of video data than are captured during the specific time period associated therewith; and, transmitting the plurality of data-frame-groups from the acquisition end to a remotely located server via an IP network, the transmission of successive data-frame-groups being separated temporally by an interval of time greater than an interval of time between capturing of a last frame included within a first data-frame-group and a first frame of a temporally adjacent subsequent data-frame-group.

BRIEF DESCRIPTION OF THE DRAWINGS

Exemplary embodiments of the invention will now be described in conjunction with the following drawings, wherein similar reference numerals denote similar elements throughout the several views, in which:

FIG. 6 is a simplified block diagram illustrating a method according to another embodiment of the instant invention, in which data-frame-groups are transmitted at non-uniform time intervals;

FIG. 7b is a simplified block diagram illustrating a method according to another embodiment of the instant invention, in which data-frame-groups are transmitted at approximately uniform time intervals but the number of frames may vary from one data-frame-group to the next;

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
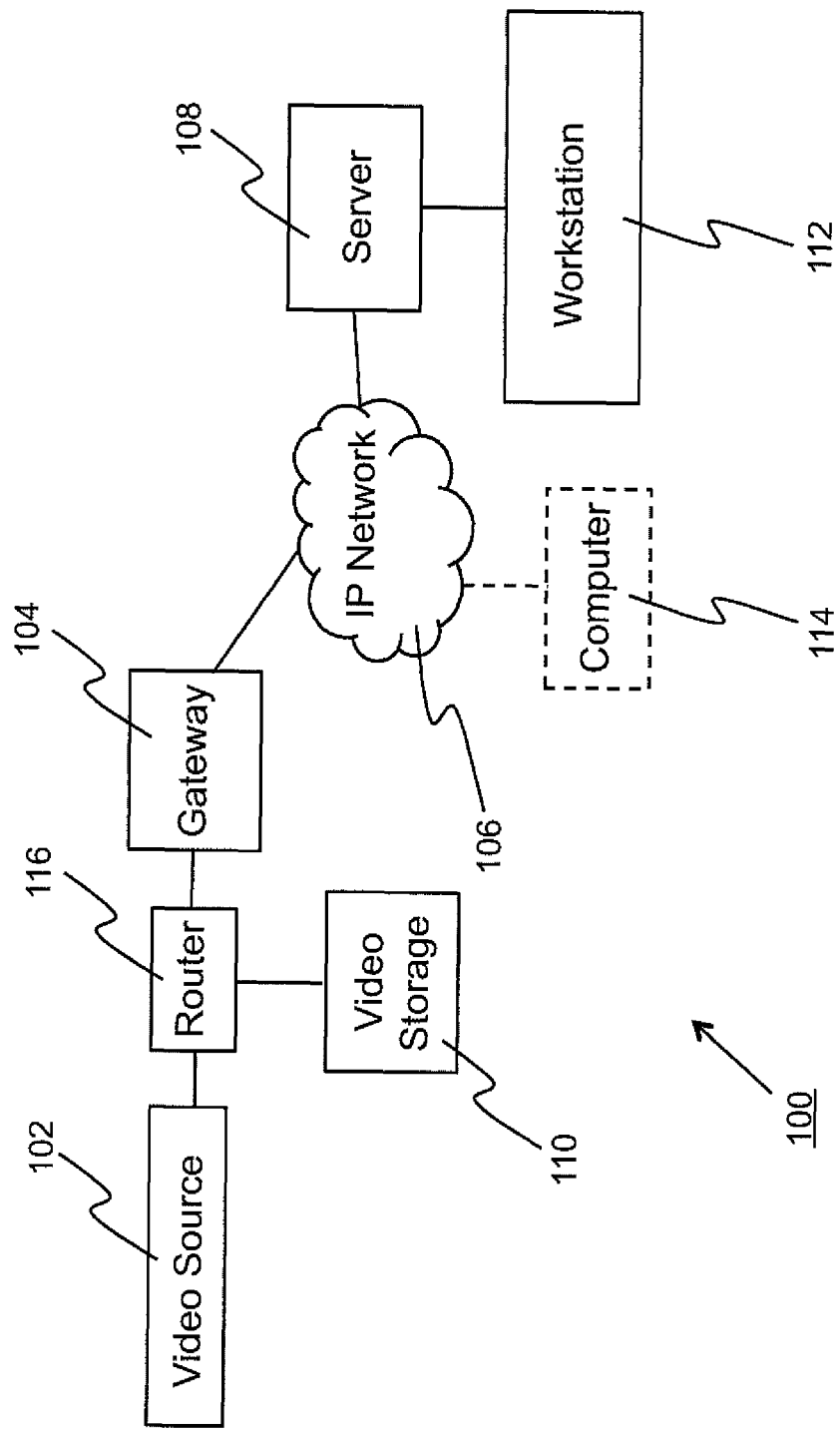
FIG. 1 is a schematic block diagram of a video monitoring system including a single video source and video analytics processing at a centralized location.

Referring to FIG. 1, shown is a schematic block diagram of a video monitoring system with video analytics processing at a centralized location. The video monitoring system 100 includes a video source 102 disposed at an acquisition end. In particular, the video source 102 is a network IP camera, such as for instance an AXIS 211M Network Camera or a similar device. Alternatively, the video source 102 is a basic IP camera that does not support on-board video analytics processing, or it is simply an analog device. Video data that are captured using the video source 102 are transmitted to a server 108 via gateway 104 and IP network 106, such as for instance the Internet of the World Wide Web. Optionally, the video source 102 connects to the IP network without a gateway 104. Optionally, the video source 102 is a mobile device, such as for instance a camera embedded in a smart phone or laptop computer. Optionally, server 108 is replaced by a server farm, which comprises a plurality of inter-communicating servers.

Referring still to FIG. 1, a video storage device 110 is provided at the acquisition end via a router 116, the video storage device 110 for retrievably storing the captured video data. By way of a specific and non-limiting example, the video storage device 110 is one of a digital video recorder (DVR), a network video recorder (NVR), and a storage device in a box with a searchable file structure. In general, the captured video data is compressed prior to being stored in the video storage device 110.

A workstation 112, including a not illustrated processing device, a display device and an input device, is also provided in communication with server 108 for supporting end-user control and video review functions. Alternatively, the server 108 and the workstation 112 are combined.

Optionally, a computer 114 is provided in communication with the IP network 106 for supporting remote access to the captured video data. For instance, a user uses a web browser application that is in execution on computer 114 for monitoring portions of the video data that are captured by the video source 102.

During use the video source 102 is deployed at the acquisition end for monitoring a known field of view (FOV). For example, the video source 102 monitors one of a parking lot, an entry/exit point of a building, and a stack of shipping containers. The video source 102 captures video data of the FOV at a known frame rate, such as for instance between about 5 FPS and about 30 FPS, and performs on-board compression of the captured video data using a suitable compression standard such as for instance MPEG-4 or H.264. Alternatively, a separate video encoder is used to digitize and compress the captured video data when the video source 102 is an analogue device. As is described below in greater detail, the captured video data is transmitted from the acquisition end to the centrally located server 108 via IP network 106. Video analytics processing of the captured video data is performed subsequently using the server 108. Optionally, the server 108 acts as a video analytics broker and assigns video analytics processing tasks to one or more not illustrated video analytics resources.

Figure 2:
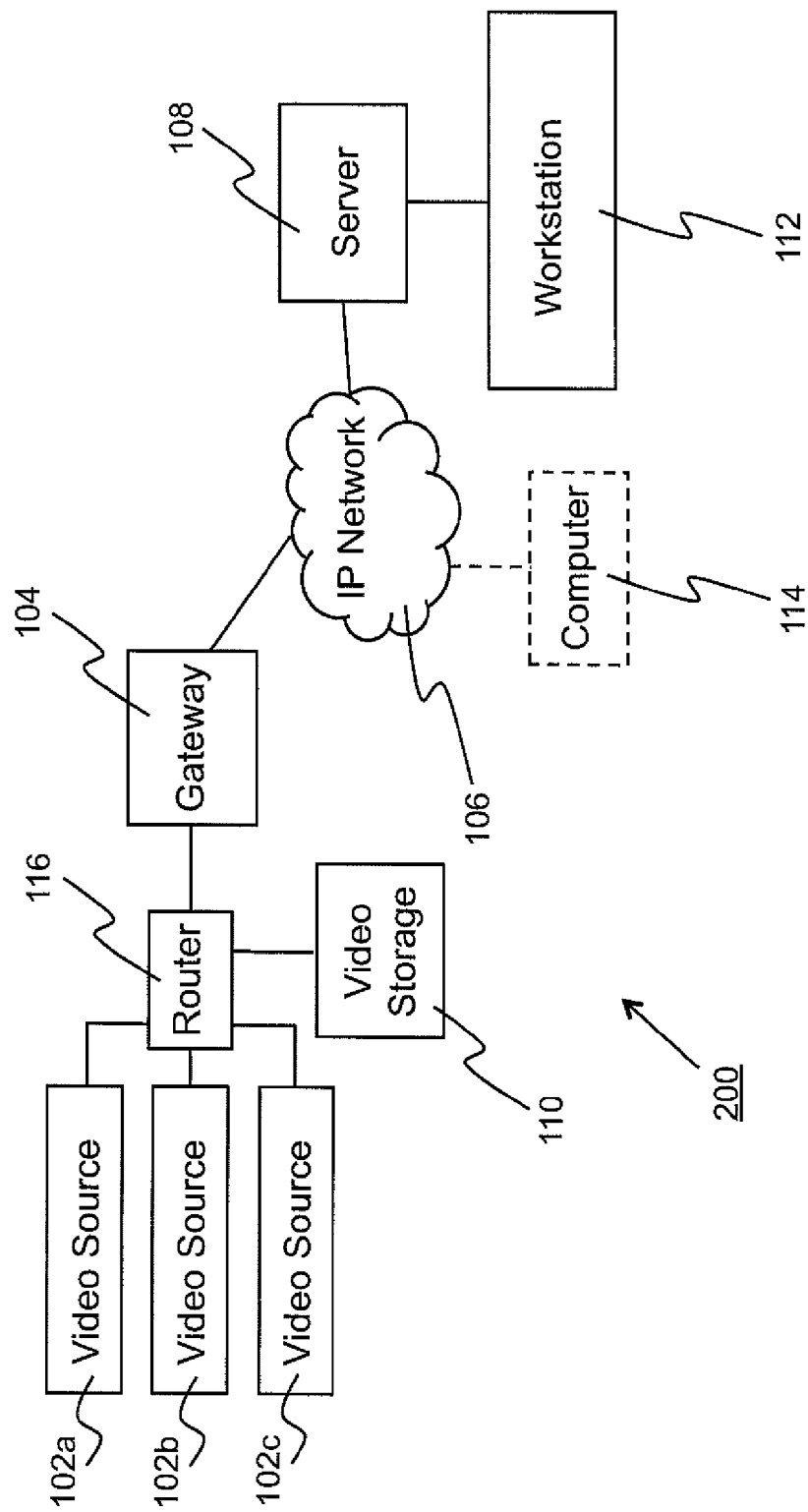
FIG. 2 is a schematic block diagram of a video monitoring system including a plurality of co-located video sources and video analytics processing at a centralized location.

FIG. 2 shows a video monitoring system 200 in which similar reference numerals are used to indicate similar parts as in FIG. 1, but with this arrangement the video source 102 is replaced by a plurality of co-located video sources 102a-c, which connect to IP network 106 via router 116. Each of the plurality of co-located video sources 102a-c is disposed at the acquisition end for monitoring a known field of view (FOV). For example, a first video source 102a monitors a parking lot, a second video source 102b monitors an entry/exit point of a building, and a third video source 102c monitors a stack of shipping containers. Each one of the video sources 102a-c captures video data at a known frame rate, such as for instance between about 5 FPS and about 30 FPS, and performs on-board compression of the captured video data using a suitable compression standard such as for instance MPEG-4 or H.264. Alternatively, a separate video encoder is used to digitize and compress the captured video data when the video sources 102a-c are analogue devices. As is described below in greater detail, the captured video data is transmitted from the acquisition end to the centrally located server 108 via IP network 106. Video analytics processing of the captured video data is performed subsequently using the server 108. Optionally, the server 108 acts as a video analytics broker and assigns video analytics processing tasks to one or more not illustrated video analytics resources.

Figure 3:
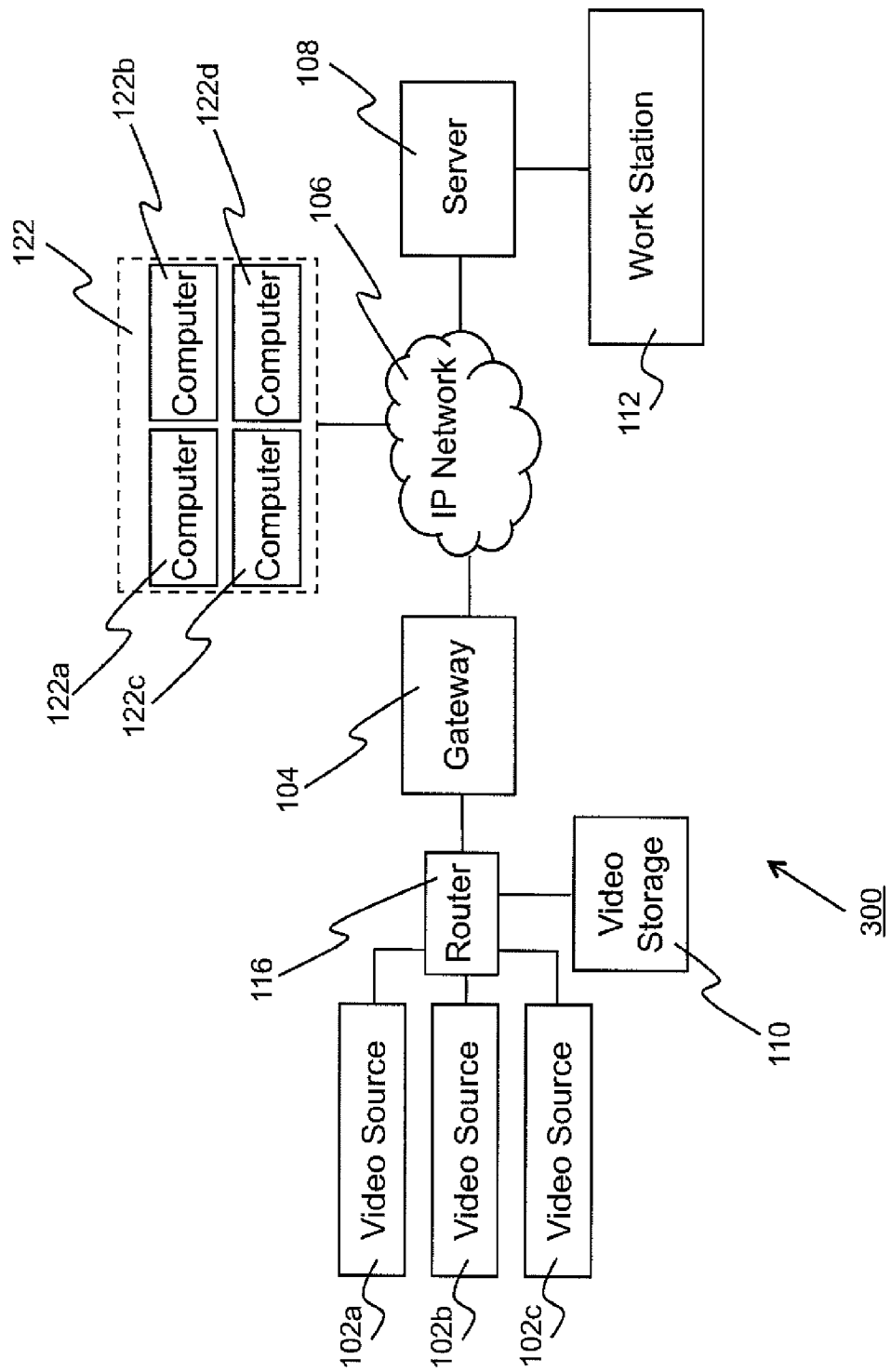
FIG. 3 is a schematic block diagram of another video monitoring system including a plurality of co-located video sources and a plurality of IP-network connected computers for performing video analytics processing at a centralized location.

FIG. 3 shows a video monitoring system 300 in which similar reference numerals are used to indicate similar parts as in FIG. 1 and FIG. 2. The system 300 includes a plurality of computers 122, including computers 122a-d, in communication with the server 108 via IP network 106. For instance, the plurality of computers 122 comprises personal computers that are connected to the IP network 106. By way of a specific and non-limiting example, the computers 122a-d are assets that are owned by a client associated with the video sources 102a-c. The server 108 coordinates "cycle stealing" among the computers 122a-d. At any given time, it is likely that at least some of the computers 122a-d are inactive and are therefore available for being used to process frames of captured video data according to a predetermined video analytics process. Furthermore, video monitoring systems are of particular importance outside of normal working hours, at which times there is a high likelihood that at least some of the computers 122a-d will be available for performing video analytics functions. Optionally, the computers 122a-d process the frames of captured video data using a basic video analytics process, and the server 108 is used to perform higher-level video analytics processing when the basic video analytics flags a potential actionable event. Further optionally the server 108 performs video analytics processing whenever none of the computers 122a-d are determined to be currently available.

Referring now to FIGS. 1-3, during use the captured video data are provided from the acquisition end to the centralized server 108 via the IP network 106. Video analytics processing of the captured video data is then performed under the control of centralized server 108. Since the server 108 is disposed at a central location, it is a relatively straightforward matter to add additional processing capacity and/or different video analytics engines as demand increases or changes. On the other hand, the bandwidth of the IP network 106 is finite and may not be expanded easily. Due to the limited bandwidth of the IP network 106, attempting simply to stream the captured video data from the acquisition end to the server 108 is likely to result in the bandwidth of the IP network 106 being exceeded. Of course, reducing the resolution of the video data being transmitted via the IP network 106 results in less network traffic, but this is achieved at the cost of providing less information to the server 108. Such an approach is wasteful of the capabilities of high-resolution video cameras.

In accordance with at least one embodiment of the instant invention, a method of transmitting video data from the acquisition end to the server 108 via IP network 106 comprises transmitting "data-frame-groups." A data-frame-group is a plurality of individual frames of video data that is transmitted together via the network 106. More particularly, data-frame-groups are transmitted in a "burst-like mode," meaning that the time between transmitting two successive data-frame-groups is long compared to the time that is required to transmit a data-frame-group, and that other video data is not transmitted during the time between transmitting two successive data-frame-groups. The frames of video data within a data-frame-group may be either consecutively captured frames of video data or non-consecutively captured frames of video data. When video compression such as H.264 is performed on the captured video data, the data-frame-group may include I-frames, P-frames, B-frames or a combination of two or more of the different types of frames.

Several different methods for defining and transmitting data-frame-groups are described below. The selection of a particular method depends on a number of factors, such as for instance the nature of the video monitoring that is being conducted, the nature of the video analytics processing that is to be performed on the captured video data, and the nature of the content of the video data, etc.

Figure 4:
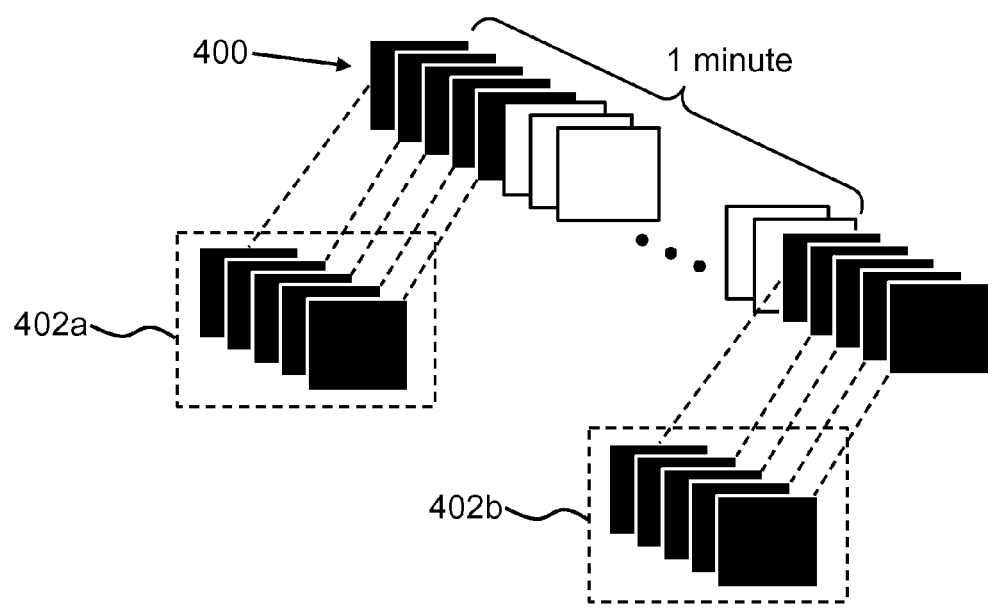
FIG. 4 is a simplified block diagram illustrating a method according to an embodiment of the instant invention, in which data-frame-groups are transmitted at approximately uniform time intervals.

Referring now to FIG. 4, shown is a simplified block diagram illustrating a method according to an embodiment of the instant invention, in which data-frame-groups are transmitted at approximately uniform time intervals. By way of a specific and non-limiting example, individual frames of video data, shown generally at 400, are captured at a frame rate of 5 FPS. Data-frame-groups 402a-b, each comprising five consecutively captured frames of video data, are transmitted to the server 108 via the IP network 106 at a rate of one data-frame-group per minute. In particular, the data-frame-group 402a is transmitted to the server 108 after the fifth frame of video data in the illustrated sequence is captured and encoded. During the remainder of the one-minute time period that is indicated in FIG. 4, the video data are captured and stored in video storage device 110, but they are not transmitted automatically to the server 108. The process is then repeated, with the data-frame-group 402b being transmitted to the server 108 at the beginning of the next one-minute time period. In this example, a single data-frame-group contains approximately one second of full frame-rate video, resulting in a reduction of network traffic compared to streaming the video data to the server in a continuous fashion. The actual reduction that is achieved depends on several parameters, including the number of frames that are included in each data-frame-group, the time interval between transmitting successive data-frame-groups, the content of the video data itself, and the video data compression scheme that is used.

Of course the video data that is stored in video storage device 110 may, at a later time, be accessed and retrieved to undergo additional video analytics processing, or to be reviewed by a human operator. For instance, if video analytics processing of data-frame-group 402b detects an actionable event, then some or all of the video data that was stored subsequent to transmitting data-frame-group 402a may be retrieved from video storage device 110 and transmitted to the server 108 via the IP network 106. By way of a specific and non-limiting example, video analytics processing is used to determine that an asset is removed from a storage location during the time interval between transmission of data-frame-group 402a and transmission of data-frame-group 402b. The server 108 transmits a message to the acquisition end, requesting at least a portion of the 59 seconds of video data that was stored during the time between transmission of data-frame-group 402a and transmission of data-frame-group 402b. The at least a portion of the 59 seconds of video data is then subjected to additional video analytics processing, or is subjected to review by a human operator, to determine additional information relevant to the removal of the asset from the storage location.

The method shown in FIG. 4 is particularly useful when the video source performs video compression, using a suitable standard such as for instance H.264. In particular, depending on the amount of movement that is occurring in the FOV and the number of data frames that are included in a data-frame-group, the data-frame-group may contain a single I-frame and several P-frames and/or B-frames. The I-frame, or intra frame, is a self-contained frame that can be decoded independently without any reference to other images, but requires the greatest amount of data to encode. On the other hand, P-frames and B-frames make reference to parts of other images and require less data to encode compared to an I-frame. Typically, network cameras and video encoders use the H.264 baseline profile, in which only I-frames and P-frames are used. As will be evident to one of skill in the art, the size of a particular data-frame-group (in bytes) depends on the content of the five frames of video data that are contained therein. For instance, an increasing amount of motion in the video data results in a larger-sized data-frame-group. In addition, at least the first frame of each data-frame-group should be an I-frame, since all subsequent P-frames in the same data-frame-group must make reference to a preceding I-frame.

Optionally, when a plurality of co-located video sources are provided, the transmission of data-frame-groups from different ones of the plurality of video sources are offset in time. For instance, the offset is selected such that transmission of a first data-frame-group is completed before transmission of a next data-frame-group begins.

In an optional implementation, the data-frame-groups are transmitted only when an I-frame is required. By way of a specific and non-limiting example, the video data is captured at a frame rate of 5 FPS, and the I-frame interval is 10 seconds. Thus, every 10 seconds a data-frame group is transmitted including an I-frame and a predetermined number of P-frames. For instance, one I-frame and four P-frames provides one second of full frame-rate video every ten seconds.

Figure 5:
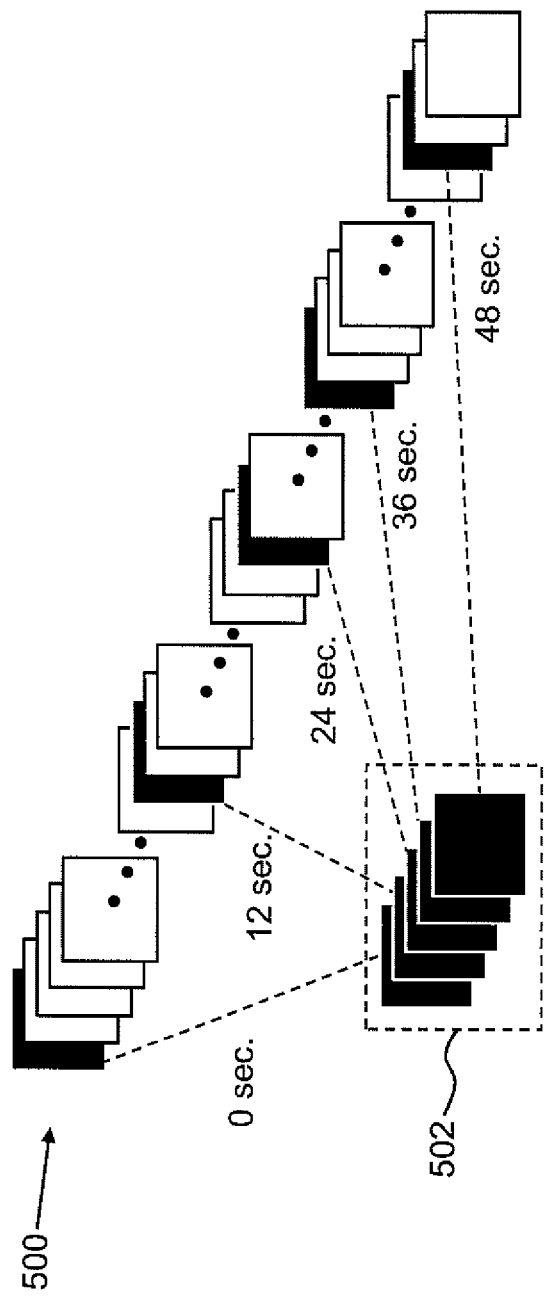
FIG. 5 is a simplified block diagram illustrating a method according to another embodiment of the instant invention, in which data-frame-groups are transmitted at approximately uniform time intervals.

Referring now to FIG. 5, shown is a simplified block diagram illustrating a method according to another embodiment of the instant invention, in which data-frame-groups are also transmitted at approximately uniform time intervals. By way of a specific and non-limiting example, individual frames of video data, shown generally at 500, are captured at a frame rate of 5 FPS. One frame of video data is collected every twelve seconds to be included in data-frame-group 502, the approximate collection times being indicated adjacent to the dotted lines in FIG. 5. The data-frame-group 502, comprising five non-consecutively captured frames of video data, is transmitted to the server 108 via the IP network 106 one time per minute. Those frames of video data that are not included in the data-frame-group 502 are captured and stored in video storage device 110, but they are not transmitted automatically to the server 108. Of course the stored video data may, at a later time, be accessed and retrieved in order to undergo additional video analytics processing, or to be reviewed by a human operator.

As with the method described supra with reference to FIG. 4, the size of a particular data-frame-group depends on the video content of the frames of video data contained therein. Unlike the method described with reference to FIG. 4, the five frames of video data are not captured uninterruptedly. Thus, the five frames of video data include one frame captured at 0 seconds, one frame captured at 12 seconds, one frame captured at 24 seconds, etc. Accordingly, each one of the individual frames of video data in data-frame-group 502 is an I-frame, which is capable of being independently decoded without any reference to other images. This is because the intermediate frames of video data, between any two successive frames in the data-frame-group 502, are not transmitted to the server 108. Without the intermediate frames of video data, there is insufficient information about motion vectors to relate the pixels in one frame to the pixels in another frame that was captured several seconds earlier. Of course, transmitting five I-frames requires more bandwidth than transmitting one I-frame and four P-frames. On the other hand the method described with reference to FIG. 5 is suitable for detecting events that are more transitory in nature, such as for instance an unauthorized person walking past a video source, since the time interval between the frames that are transmitted to the server 108 is only twelve seconds compared to nearly one minute for the first scheme. Optionally, one I-frame and 4 P-frames are transmitted even though the frames are 12 seconds apart.

Optionally, when a plurality of co-located video sources are provided, the transmission of data-frame-groups from different ones of the plurality of video sources may be offset in time. For instance, the offset is selected such that transmission of a data-frame-group from a first video source is completed before transmission of a data-frame-group from a second video source begins. Alternatively, a single data-frame-group is formed from the video data from each of several video sources.

Referring now to FIG. 6, shown is a simplified block diagram illustrating a method according to another embodiment of the instant invention, in which data-frame-groups are transmitted at non-uniform time intervals. By way of a specific and non-limiting example, the video data is captured at a frame rate of 5 FPS. One frame of video data is collected every twelve seconds to be included in a next data-frame-group 602a-b. Each data-frame-group 602a-b is transmitted to the server 108 via IP network 106 when the size of the data-frame-group reaches a predetermined threshold value. For instance, a data-frame-group is transmitted once a size of 5 MB is exceeded. In the instant example, the frames of video data are not captured consecutively. For instance, one frame is captured at 0 seconds, another frame is captured at 6 seconds, and another frame is captured at 12 seconds, etc. The number of frames of video data in each data-frame-group depends on the video data content etc., and different data-frame-groups may contain different numbers of frames of video data. In the instant example, data-frame-group 602a contains three frames of video data totaling 5 MB whilst data-frame-group 602b contains four frames of video data also totaling 5 MB. The data-frame-groups 602a and 602b are transmitted twenty-four seconds and 72 seconds, respectively, after the first video frame is captured at t=0 seconds. Accordingly, the time interval spacing between transmitting successive data-frame-groups is dependent on the video data content.

As discussed supra with reference to FIG. 4 and FIG. 5, those frames of video data that are not included in the data-frame-group 602a or 602b are captured and stored in video storage device 110, but they are not transmitted automatically to the server 108. Of course the stored video data may, at a later time, be accessed and retrieved in order to undergo additional video analytics processing, or to be reviewed by a human operator.

As discussed supra with reference to FIG. 5, each one of the individual frames of video data in data-frame-group 602a or 602b is an I-frame, which is capable of being independently decoded without any reference to other images. This is because the intermediate frames of video data, between any two successive frames in the data-frame-group 602*a* or 602*b*, are not transmitted to the server 108. Without the intermediate frames of video data, there is insufficient information about motion vectors to relate the pixels in one frame to the pixels in another frame that was captured several seconds earlier. Of course, transmitting five I-frames requires more bandwidth than transmitting one I-frame and four P-frames. On the other hand the method described with reference to FIG. 6 is suitable for detecting events that are more transitory in nature, such as for instance an unauthorized person walking past a video source, since the time interval between the frames that are transmitted to the server 108 is only twelve seconds compared to nearly one minute for the first scheme.

Figure 7A:
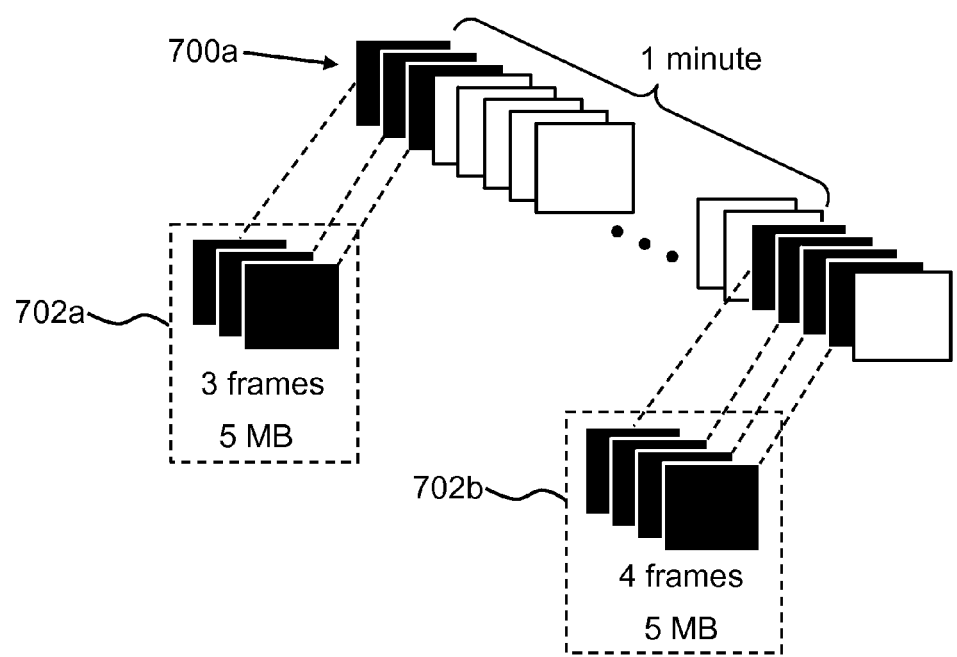
FIG. 7a is a simplified block diagram illustrating a method according to another embodiment of the instant invention, in which data-frame-groups are transmitted at approximately uniform time intervals but the number of frames may vary from one data-frame-group to the next.

Referring now to FIGS. 7*a* and 7*b*, shown are simplified block diagrams illustrating a method according to another embodiment of the instant invention, in which data-frame-groups are transmitted at approximately uniform time intervals but the number of frames may vary from one data-frame-group to the next. By way of a specific and non-limiting example, the video data is captured at a frame rate of 5 FPS, and one time every minute a data-frame-group is transmitted including as many frames of video data as can be accommodated with a predetermined amount of data, such as for instance 5 MB. Referring to FIG. 7*a*, the frames of video data are captured consecutively. In this case, 5 MB of the captured video data is "streamed" to server 108 via network 106, after which the "streaming" is stopped. In this example, three frames of video data are transmitted in the data-frame-group 702*a*, and approximately one minute later another four frames of video data are transmitted in the data-frame-group 702*b*. Alternatively, as shown in FIG. 7*b*, the frames of video data are captured non-consecutively. In this example, the data-frame-group 702*c* comprises three non-consecutive frames of video data collected at 0 seconds, 12 seconds and 24 seconds, having a total transmission data size of 5 MB. The data-frame-group 702*c* is transmitted to the server 108 at the end of the one-minute period indicated in FIG. 7*b*. Similarly, the data-frame-group 702*d* comprises two non-consecutive frames of video data captured at 60 seconds and at 72 seconds. The data-frame-group 702*d* also has a total transmission data size of 5 MB, and is transmitted at the end of a second one-minute interval. Optionally, a process selects individual frames of video data that are spaced at more uniform intervals between the transmissions of the successive data-frame-groups. Thus, referring still to FIG. 7*b*, optionally the data-frame-group 702*c* includes three frames of video data collected at 0 seconds, twenty seconds and forty seconds, and the data-frame-group 702*d* includes two frames of video data collected at 60 seconds and 90 seconds. According to the methods described with reference to FIG. 7*a* or 7*b*, the amount of video data in any particular video source is capped in order to avoid exceeding the available bandwidth of the IP network 106. Optionally, the predetermined amount of data is varied depending on current network traffic levels. Thus, each data-frame-group may be increased to 10 MB in size if more bandwidth becomes available, or it may be reduced to 2 MB if less bandwidth is available. Optionally, different video sources are permitted different amounts of data. For instance, a video source that is monitoring a main entry to a building is permitted 10 MB for each data-frame-group, whereas a video source that is monitoring an inside stairwell is permitted only 2 MB for each data-frame-group.

Figure 8:
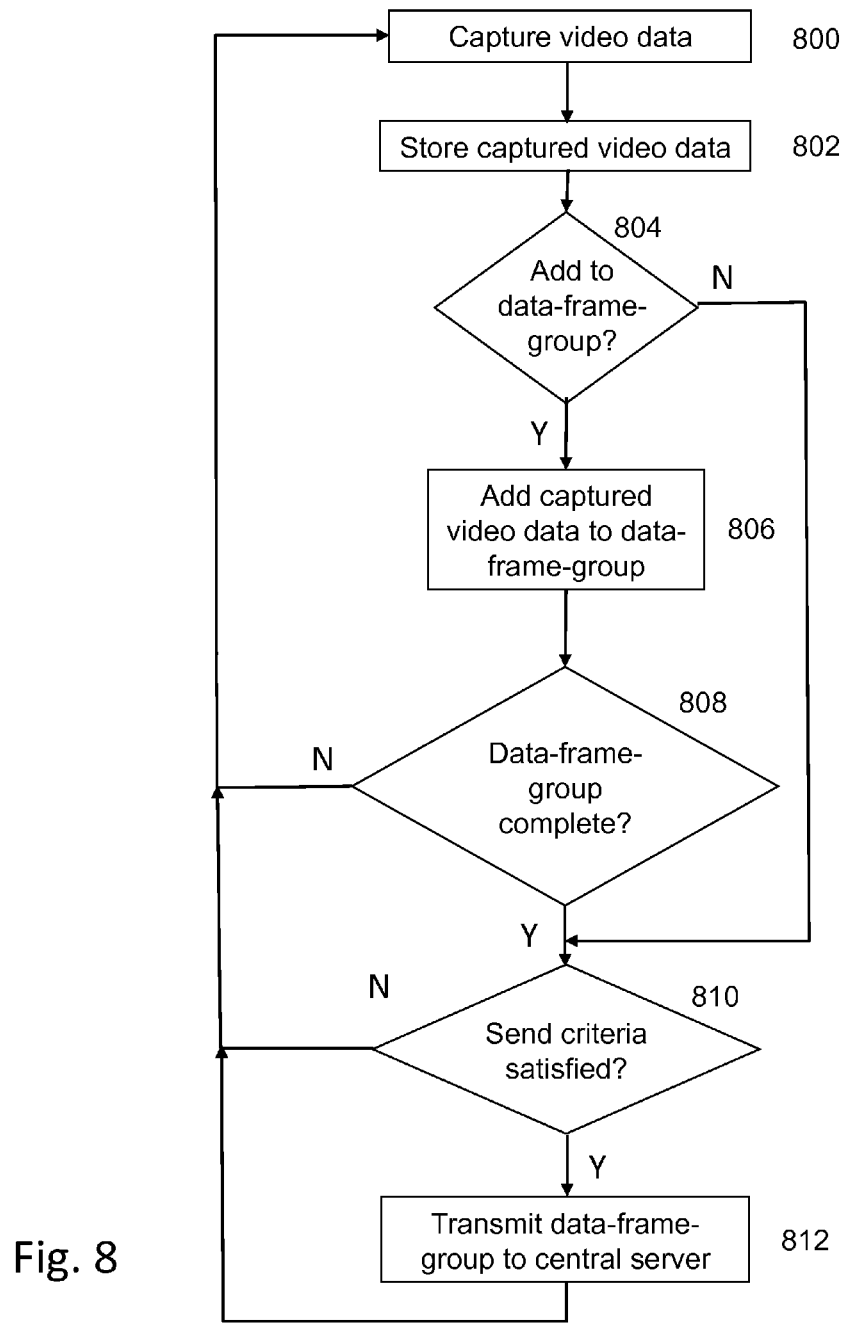
FIG. 8 is a simplified flow diagram of a method according to an embodiment of the instant invention.

Referring now to FIG. 8, shown is a simplified flow diagram for carrying out the methods that are described with reference to FIGS. 4, 5, 7*a* and 7*b*. In particular, FIG. 8 relates to those methods in which the data-frame-groups are transmitted when predetermined "send criteria" are satisfied. In the specific and non-limiting examples that are discussed with reference to FIGS. 4, 5, 7*a* and 7*b*, the predetermined send criteria are satisfied at the end of each one of the uniform time intervals.

Referring still to FIG. 8, at 800 video data is captured using a video source disposed at an acquisition end. The captured video data is encoded and retrievably stored in a video storage device at 802. At 804 it is determined whether the captured video data, e.g. a most recent video data frame, is to be added to the data-frame-group. For instance, with reference to FIG. 4 the video data frame is added if it is one of the first five frames of video data that is captured after transmission of the previous data-frame-group. Alternatively, with reference to FIG. 5, the video data frame is added if it is captured at 0 seconds, 12 seconds, 24 seconds, etc. If it is determined that the video data frame is to be added to the data-frame-group, then at 806 the data-frame-group is updated to include the most recent video data frame. It is then determined at 808 whether the data-frame-group is complete. For instance, with reference to FIGS. 4 and 5, the data-frame-group is considered to be complete after the fifth video data frame is added. When it is determined at 808 that the data-frame-group is complete, or when it is determined at 804 that the most recent video data frame is not to be added to the data-frame-group, then a decision is made at 810 whether or not the "send criteria" has been satisfied. For instance, it is determined whether a predetermined time interval, such as for example one minute, has elapsed since the previous data-frame-group was transmitted to the central server 108. If the "send criteria" are satisfied, then at 812 the data-frame-group is transmitted to the central server 108. On the other hand, if it is determined that the "send criteria" are not satisfied, then the method returns to 800 and new video data is captured.

Figure 9:
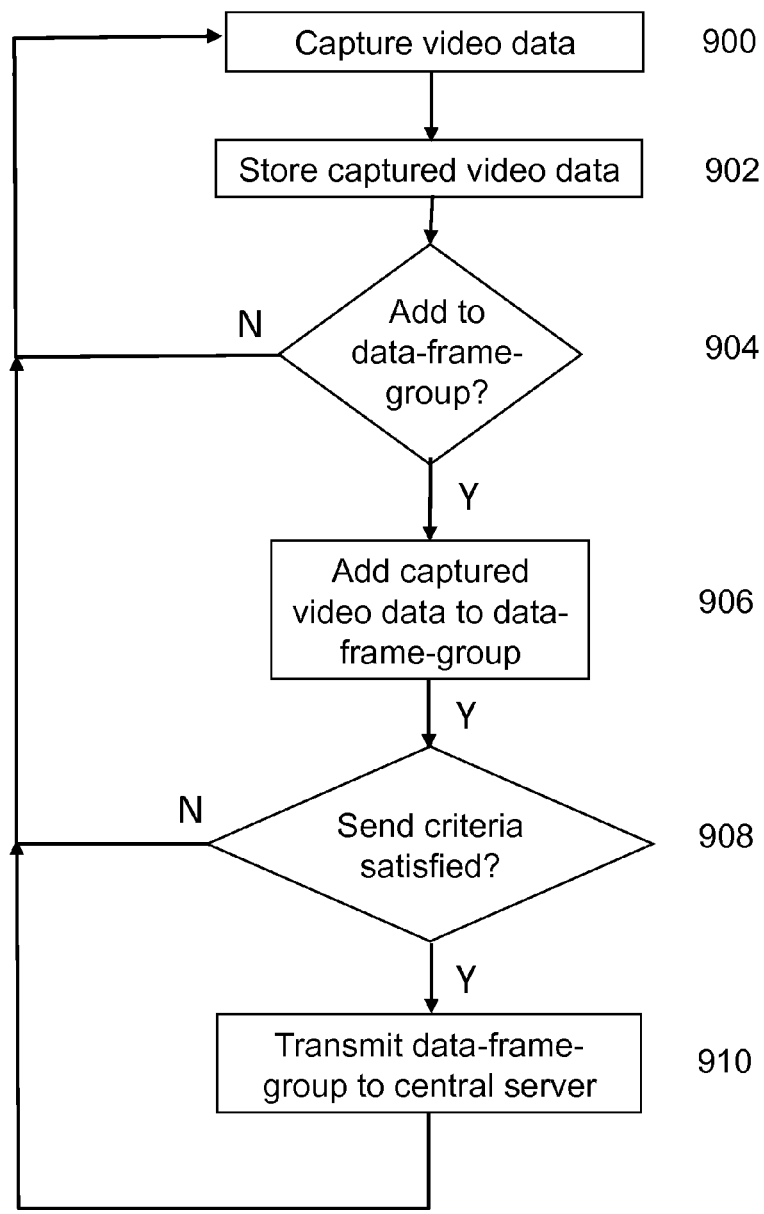
FIG. 9 is a simplified flow diagram of a method according to an embodiment of the instant invention.

Referring now to FIG. 9, shown is a simplified flow diagram for carrying out the method that is described with reference to FIG. 6. FIG. 9 relates to those methods in which the criteria for sending a data-frame-group are based on a current property of the data-frame-group. For instance, in the specific and non-limiting example that is discussed with reference to FIG. 6 the data-frame-group is transmitted to the server 108 when the data-frame-group reaches a predetermined maximum size. Optionally, the "send criteria" are satisfied when a predetermined number of video data frames have been added to the data-frame-group, etc.

Referring still to FIG. 9, video data is captured at 900 using a video source disposed at an acquisition end. The captured video data is encoded and retrievably stored in a video storage device at 902. At 904 it is determined whether the captured video data, e.g. a most recent video data frame, is to be added to the data-frame-group. For instance, with reference to FIG. 6 the video data frame is added if it is captured at 0 seconds, 12 seconds, 24 seconds, etc. If it is determined that the video data frame is to be added to the data-frame-group, then at 906 the data-frame-group is updated to include the most recent video data frame. It is then determined at 908 whether or not the "send criteria" have been satisfied. For instance, it is determined whether the data-frame-group exceeds a predetermined maximum size, such as for example 5 MB. If the "send criteria" are satisfied, then at 910 the data-frame-group is transmitted to the central server 108. On the other hand, if it is determined that the "send criteria" are not satisfied the method returns to 900 and new video data is captured.

Referring now to FIGS. 8 and 9, after the data-frame-group is transmitted to the central server 108 via IP network 106, video analytics processing is performed on the video data of the data-frame-group for detecting actionable events. Different actionable events may be defined based on the type of asset that is being monitored within the FOV of a particular video source, and based upon the nature of unauthorized or suspicious activity that is anticipated. By way of a few specific and non-limiting examples, actionable events include: an unknown car entering a monitored parking lot; a visitor approaching a monitored building entry/exit point; and, removal of a monitored shipping container from the FOV of the video source. Typically, changes such as movement of foliage, weather conditions, street traffic, animal movements, etc. are ignored, as the video analytics process learns what is extraneous background motion.

In response to detecting the actionable event the server optionally transmits a signal to the video source requesting initiation of fuller frame-rate transmission of captured video data via the IP network 106. In addition to requesting fuller frame rate transmission of video data, server 108 optionally provides an alarm signal to the client via one of the IP network 106, a not illustrated telephone system or a not illustrated pager service, etc. The client optionally accesses and reviews the fuller frame-rate video data or another video stream from the video source using optional computer 114 or using a suitable mobile device, etc. Optionally, the server 108 requests transmission of stored video data from the acquisition end, the stored video data having been captured during a period of time between transmission of a current data-frame-group and transmission of a previous data-frame-group.

Figure 10:
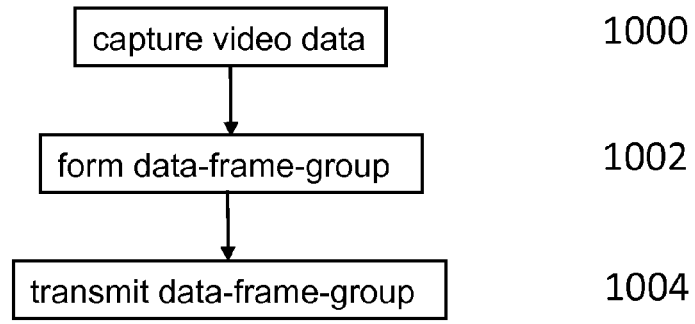
FIG. 10 is a simplified flow diagram of a method according to an embodiment of the instant invention.

Referring now to FIG. 10, shown is a simplified flow diagram of a method according to an embodiment of the instant invention. At 1000 video data is captured using a video source disposed at an acquisition end. The video data comprises a plurality of individual frames of video data that are captured during a first period of time. In particular, the individual frames of video data are captured consecutively at a known frame rate. At 1002 a data-frame-group is formed comprising at least two individual frames of video data selected from the plurality of individual frames of video data. The data-frame-group comprises relatively fewer individual frames of video data than the plurality of individual frames of video data. At 1004 the data-frame-group is transmitted from the acquisition end to a remotely located server via an IP network.

Figure 11:
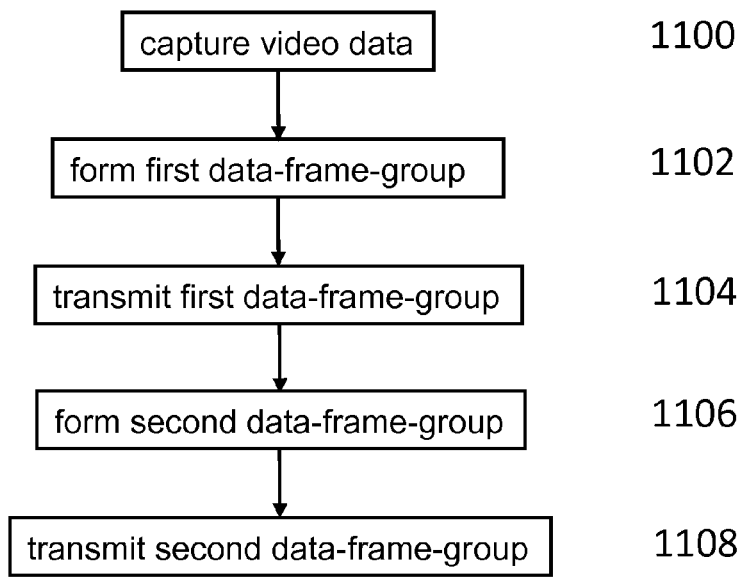
FIG. 11 is a simplified flow diagram of a method according to an embodiment of the instant invention; and, FIG. 12 is a simplified flow diagram of a method according to an embodiment of the instant invention.

Referring now to FIG. 11, shown is a simplified flow diagram of a method according to an embodiment of the instant invention. At 1100 video data is captured using a video source disposed at an acquisition end. The video data comprises a first plurality of individual frames of video data that are captured consecutively during a first period of time and a second plurality of individual frames of video data that are captured consecutively during a second period of time. In particular, the individual frames of video data are captured at a known frame rate. At 1102 a first data-frame-group is formed, comprising at least two individual frames of video data selected from the first plurality of individual frames of video data. The first data-frame-group comprises relatively fewer individual frames of video data than the first plurality of individual frames of video data. At 1104 the first data-frame-group is transmitted, at a first time, from the acquisition end to a remotely located server via an IP network. At 1106 a second data-frame-group is formed, comprising at least two individual frames of video data selected from the second plurality of individual frames of video data. The second data-frame-group comprising relatively fewer individual frames of video data than the second plurality of individual frames of video data. At 1108 the second data-frame-group is transmitted, at a second time that is separated from the first time by an interval of time, from the acquisition end to the remotely located server via the IP network.

Figure 12:
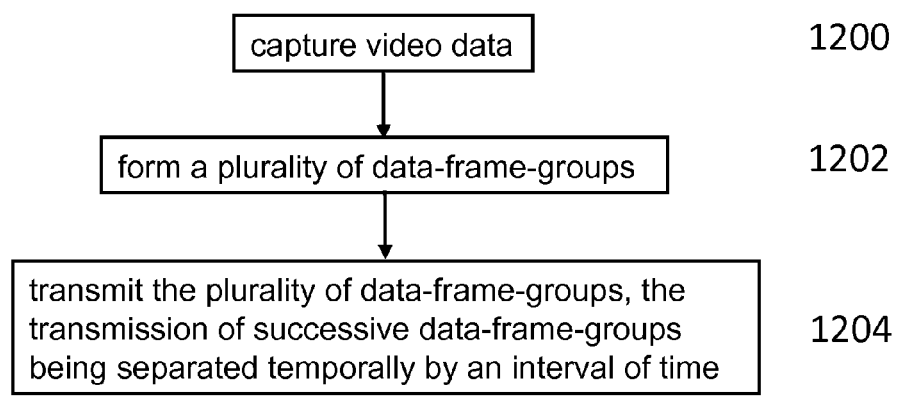

Referring now to FIG. 12, shown is a simplified flow diagram of a method according to an embodiment of the instant invention. At 1200 a plurality of individual frames of video data is captured using a video source disposed at an acquisition end. At 1202 a plurality of data-frame-groups is formed, each data-frame-group being associated with a different time period of a plurality of consecutive and non-overlapping time periods, such that a data-frame-group that is associated with a specific time period comprises individual frames of video data that are captured during that specific time period. In particular, each data-frame-group comprises relatively fewer individual frames of video data than are captured during the specific time period associated therewith. At 1204 the plurality of data-frame-groups is transmitted from the acquisition end to a remotely located server via an IP network. In particular, the transmission of successive data-frame-groups is separated temporally by an interval of time.

The systems that are shown in FIGS. 1 to 3 may employ any number of co-located video sources, as determined by the needs of a particular client and as dictated by the nature of the assets that are being monitored. As the number of video sources increases, additional routers and gateways may be added as required in order to support transmission of video data that are captured by the video sources. In addition, a plurality of different clients may provide captured video data to a same server 108 via IP network 106. For instance, each client of the plurality of clients is a subscriber to a video analytics service that is hosted on the server 108. The server 108 optionally performs different video analytics processing for different clients.

Optionally, the captured video data are provided to an encoder to be compressed instead of performing the compression on-board a video camera. Further optionally, the video sources comprise analog devices. For instance, the video sources comprise an analog camera and the video data captured by the analog camera is digitized prior to being transmitted via the IP network or stored at the acquisition end.

The systems that are described with reference to FIGS. 1-3 include local storage of video data at the acquisition end for supporting the functions of storing and providing historical data when an actionable event is detected. Optionally, the video storage device is integrated within one or more video capture devices. For example, a video camera with flash memory set up as a loop recorder provides video data and video storage in a single device.

In alternative embodiments of the above, the video data that is other than transmitted is not stored locally. In further alternative embodiments, the video data from each of a plurality of co-located video sources is grouped together into a single data-frame-group for transmission instead of being grouped into separate data-frame-groups.

Numerous other embodiments may be envisaged without departing from the scope of the invention.

What is claimed is:

1. A method comprising:
    capturing video data using a video source disposed at an acquisition end, the video data comprising a plurality of individual frames of video data that are captured during a first period of time, the individual frames of video data being captured consecutively at a known frame rate;
    automatically forming a first data-frame-group comprising at least two non-consecutively captured individual frames of video data selected from the plurality of individual frames of video data, the individual frames of the at least two non-consecutively captured individual frames of video data captured at substantially regular time intervals during the first period of time, the first data-frame-group comprising non-consecutive frames including both the at least two non-consecutively captured individual frames of video data, without all intermediate frames of video data therebetween;

transmitting the first data-frame-group from the acquisition end to a remotely located server via an IP network;

automatically forming a second data-frame-group comprising at least two other non-consecutively captured individual frames of video data selected from the plurality of individual frames of video data, the individual frames of the at least two other non-consecutively captured individual frames of video data captured at substantially regular time intervals during the first period of time, the second data-frame-group comprising non-consecutive frames including both the at least two other non-consecutively captured individual frames of video data, without all intermediate frames of video data therebetween, and the second data-frame-group and the first data-frame-group in combination comprising fewer individual frames of video data than the plurality of individual frames of video data; and, transmitting the second data-frame-group from the acquisition end to the remotely located server via the IP network, wherein the second data-frame-group is transmitted at a time that is separated from a time of transmission of the first data-frame-group by an interval of time that is longer than a time interval between capturing a last frame of the first data-frame-group and a first frame of the second data-frame-group, and wherein the first data-frame group and the second data-frame group are both formed absent performing video analytics processing of the plurality of individual frames of video data that are captured during the first period of time.

2. The method according to claim 1, comprising receiving the first data-frame-group at the server and performing video analytics processing on the video data of the first data-frame-group, wherein the video analytics processing is for detecting an occurrence of an actionable event during the first period of time.

3. The method according to claim 2, comprising in response to detecting an actionable event, transmitting to the acquisition end via the IP network a signal for requesting transmission of captured video data at the known frame rate.

4. The method according to claim 2, comprising storing at the acquisition end the plurality of individual frames of video data that are captured during the first period of time.

5. The method according to claim 4, comprising in response to detecting an actionable event, transmitting to the acquisition end via the IP network as signal for requesting stored video data that was captured prior to a time of transmission of the second data-frame-group.

6. The method according to any one of claims 1 to 5, wherein each of the first data-frame-group and the second data-frame-group is limited to a predetermined maximum data size.

7. The method according to any one of claims 1 to 5, wherein the first data-frame-group is transmitted from the acquisition end to the remotely located server via the IP network during a second period of time that is subsequent to and not overlapping with the first period of time.

8. The method according to claim 1, wherein the interval of time is predetermined, such that successive data-frame-groups are transmitted to the server via, the IP network at approximately uniform time intervals.

9. The method according to claim 1, wherein the interval of time depends upon a maximum permitted size of the second data-frame-group and upon the sizes of the individual frames of the at least two other non-consecutively captured individual frames of video data.

10. The method according to claim 8, wherein the first data-frame-group and the second data-frame-group each comprise a same number of individual frames of video data.

11. The method according to claim 8 or 9, wherein the first data-frame-group and the second data-frame-group comprise a different number of individual frames of video data.

12. A method comprising:

capturing a plurality of individual frames of video data using a video source disposed at an acquisition end, the individual frames of video data being captured consecutively at a known frame rate;

automatically forming a plurality of data-frame-groups, each data-frame-group being associated with a different time period of a plurality of consecutive and non-overlapping time periods, such that a data-frame-group that is associated with as specific time period comprises at least two non-consecutively captured individual frames of video data that are captured during that specific time period and comprising non-consecutive frames including both the at least two non-consecutive captured individual frames of video data, without all intermediate frames of video data therebetween and such that each data-frame-group comprises fewer individual frames of video data than are captured during the specific time period associated therewith; and, transmitting, the plurality of data-frame-groups from the acquisition end to as remotely located server via an IP network, the transmission of successive data-frame-groups being separated temporally by an interval of time greater than an interval of time between capturing or a last frame included within a first data-frame-group and a first frame or a temporally adjacent subsequent data-frame-group, wherein the data-frame-groups of the plurality of data-frame groups are formed absent performing video analytics processing of the plurality of individual frames of video data.

13. The method according to claim 12, wherein each data-frame-group of the plurality of data-frame-groups comprises a same number of individual frames of video data.

14. The method according to claim 12 or 13, wherein the interval of time is predetermined, such that successive data-frame-groups are transmitted to the server via the IP network at approximately uniform time intervals.

15. The method according to claim 12, wherein some of the data-frame-groups comprise a different number of individual frames of video data than other data-frame-groups of the plurality of data-frame-groups.

16. The method according to claim 12 or 15, wherein the interval of time depends upon a maximum permitted size of the temporally adjacent subsequent data-frame-group and upon the sizes of the individual, frames of video data that are captured during the specific time period that is associated with the temporally adjacent subsequent data-frame-group.

17. The method according to claim 12, comprising receiving each data-frame-group of the plurality of data frame groups at the server and performing video analytics processing on the video data of each data-frame-group, wherein the video analytics processing is for detecting an occurrence of an actionable event.

18. The method according to claim 17, comprising in response to detecting an actionable event, transmitting to the acquisition end via the IP network a signal for requesting transmission of captured video data at the known frame rate.

19. The method according to claim 12, comprising storing at the acquisition end the plurality of individual frames of video data.

* * * * *